United States Patent [19]

Tribuzio et al.

[11] Patent Number: 5,558,185
[45] Date of Patent: Sep. 24, 1996

[54] INPUT LEVER FOR ACTUATING A PUSH ROD FOR A BRAKE MOTOR

[75] Inventors: Pasquale Tribuzio, Bitonto; Angelantonio Errico, Giovinazzo, both of Italy

[73] Assignee: AlliedSignal Freni SPA, Modungo, Italy

[21] Appl. No.: 211,843

[22] PCT Filed: Mar. 30, 1994

[86] PCT No.: PCT/EP94/00997

§ 371 Date: Apr. 19, 1994

§ 102(e) Date: Apr. 19, 1994

[87] PCT Pub. No.: WO94/25774

PCT Pub. Date: Nov. 10, 1994

[30] Foreign Application Priority Data

Apr. 30, 1993 [IT] Italy ................... TO93A0299

[51] Int. Cl.⁶ ................................. F16D 55/26
[52] U.S. Cl. ............... 188/72.6; 188/72.7; 188/72.9; 188/106 F
[58] Field of Search ............... 188/72.4, 72.6, 188/72.7, 72.9, 106 F; 192/93 B, 93 C

[56] References Cited

U.S. PATENT DOCUMENTS

| 4,109,765 | 8/1978 | Johannesen | 188/72.9 X |
| 4,454,933 | 6/1984 | Hunnicutt et al. | 188/72.7 X |

FOREIGN PATENT DOCUMENTS

92/07202  4/1992  WIPO.

Primary Examiner—Lee W. Young
Attorney, Agent, or Firm—Leo H. McCormick, Jr.

[57] ABSTRACT

A device for actuating a piston located in a cylinder of a disk brake. A push rod translationally secured to the piston is connected to a lever through a ball joint. The lever extend through an elongated opening in an end member secured to the cylinder. The end member has an inclined plane which forms a cam surface with respect to an axial plane of the cylinder. A roller member attached to the lever engages the inclined plane at a single point of engagement. An input force applied to the lever causes the roller member to move on the inclined plane and impart pure axial translational movement to the push rod to correspondingly move the piston within the cylinder and correspondingly effect an actuation of the disk brake.

4 Claims, 1 Drawing Sheet

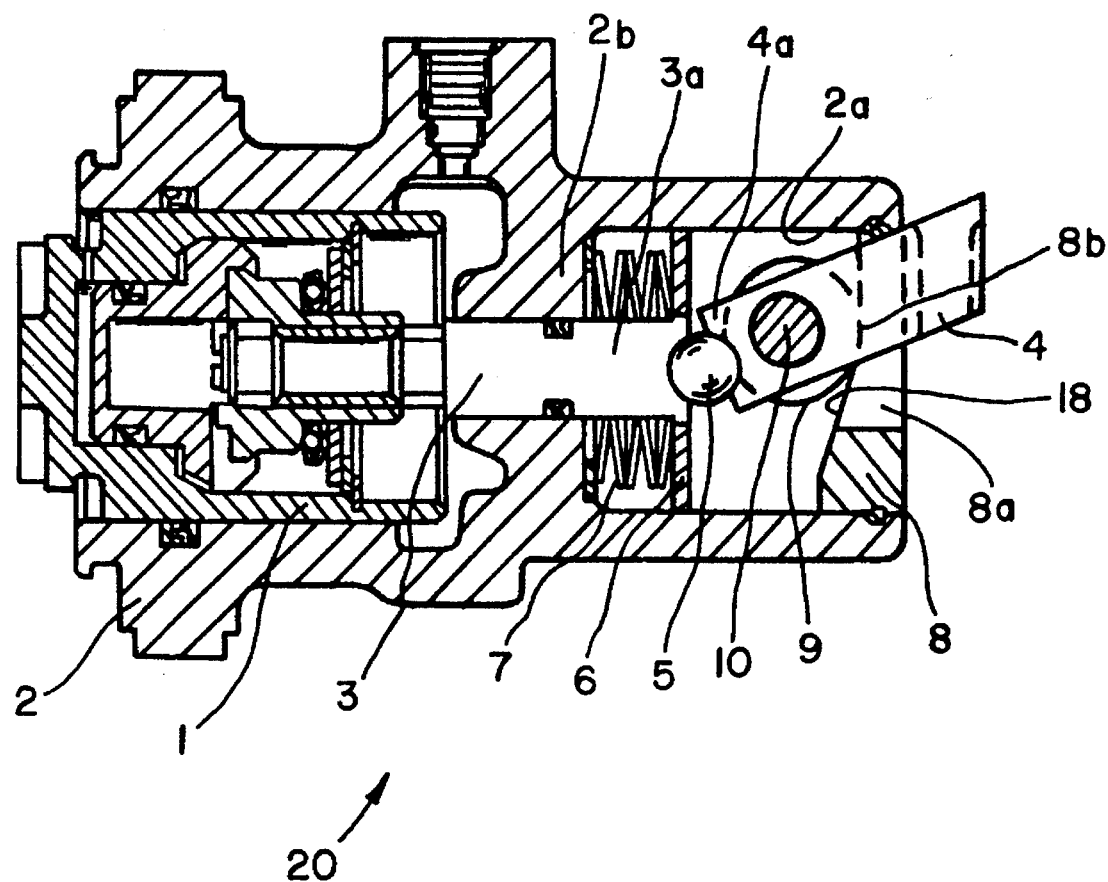

INPUT LEVER FOR ACTUATING A PUSH ROD FOR A BRAKE MOTOR

The present invention relates to a mechanical device for actuating a piston with respect to a cylinder, particularly in a disk brake, this device comprising a push rod translationally secured to the piston, a lever mounted so that it can rotate with respect to the cylinder in an axial plane of the latter, a ball joint joining one end of the lever to one end of the push rod to allow a relative rotation of this lever and of this push rod, a means for translationally guiding the push rod in the cylinder, a rolling surface which is fixed with respect to the cylinder and roller means which forms a cam, and at least one rolling member bearing on the surface forming a cam to allow the lever to roll over this surface, this rolling being accompanied by a rotation of this lever about the ball joint and by a translation of this ball joint and of the push rod with respect to the cylinder.

DESCRIPTION OF THE PRIOR ART

Devices for actuation of a piston in a brake are well known in the prior art and one example thereof is given by document WO 92/07202.

The design of these devices is subject to many constraints, including, in particular, requirements for mechanical efficiency and for low manufacturing cost.

Although the previously identified prior document relates to a brake designed with the intention of responding to these requirements, the kinematics of the system which it describes is affected by the structure adopted, it being impossible for the push rod to be given a pure translational movement.

SUMMARY OF THE INVENTION

Within this context, the object of the present invention is to propose a brake motor of the type defined before, of simple structure, but nevertheless making it possible to give the push rod a pure axial translational movement.

To this end, the device of the invention is essentially characterized in that the rolling member bears on the rolling surface at only one single point of the axial plane of the cylinder.

According to a simple and effective embodiment, the ball joint consists of a ball trapped between the end of the push rod and the end of the lever and the rolling member is a roller mounted so that it can rotate on the lever.

For example, the surface which forms a cam may essentially consist of an inclined plane, and the push rod may be urged toward the lever by at least one Belleville washer.

Other features and advantages of the invention may emerge from the description thereof which is given hereafter.

BRIEF DESCRIPTION OF THE DRAWINGS

The single FIGURE is a sectional view of a piston actuation member made in accordance with the invention.

DETAILED DESCRIPTION OF THE DRAWINGS

The piston actuation means 20 is designed for the mechanical actuation of the piston 1 of a disk brake with respect to a cylinder 2. The piston actuation means comprises a push rod 3 translationally secured to the piston 1, a lever 4 mounted so that it can rotate in an axial plate with respect to the cylinder 2 and a ball joint consisting of a ball 5 which is resiliently retained or trapped between the end semi-spherical indentation on 3a of the push rod 33 and the end semi-spherical indentation on 4a of the lever 4. The ball 5 allows end 4a to allow a relative rotation of this lever 4 and of this push rod 3.

The push rod is secured or retained in a translational guidance means in the form of a plate 6 which is capable of sliding in a bore 2a of the cylinder. Push rod 3 is urged toward the lever 4 by a stack of Belleville washers, which urge and push the guide plate 6 back or away from a fixed part or bearing member 2b of the cylinder 2.

An end member 8 which is fixed to close bore 2a of cylinder 1 has an inclined plane 18 which forms a camed rolling surface.

An elongated opening 8a made in and member 8 extends in the plane of the FIGURE to allow lever 4 to be traversed within bore 2a.

A roller 9 retained on a roller bearing 10 is mounted so that it can rotate with respect to a fixed point of the lever 4. Roller 9 is offset from lever 4 and bears on the inclined plane 18 which forms a cam to allow translation of the lever 4 within bore 2a. The rolling of roller 9 on the inclined plane 18 being accompanied by a rotation of lever 4 about the ball 5 to develop a translation of ball 5, push rod 3 and piston 1 with respect to the cylinder 2.

According to the invention, the roller 9 bears on the rolling surface 18 at only one single point 8b of the axial plane of the cylinder 2 and as a result it provides push rod 3 with a pure axial translational movement.

It should be clearly understood that point 8b corresponds to a line in the axial plane of the device piston actuation means 20 which contains the rotational movement of the lever 4 where the rolling surface 18 and the roller 9 are tangential to one another.

According to an advantageous embodiment of the invention, the lever 4 may be equipped with an addition roller which is retained on bearing 10 such that a roller 9 would be located on either side of the elongate opening 8a to prevent any force which is perpendicular to the axial plane from arising.

We claim:

1. A mechanical device for actuating a piston located in a cylinder housing of a disk brake, said device comprising: a push rod translationally secured to said piston, a lever connected to said push rod for axially moving said piston within said cylinder, a ball located in a first semi-spherical indentation on an end of said push rod and in a second semi-spherical indentation on an end of said lever to form a joint for connecting said lever to said push rod, said ball allowing relative rotation of said lever with respect to said push rod, means for translationally guiding said push rod in said cylinder, an end member secured to said cylinder and having a vertical inclined plane thereon adjacent an elongated opening, said lever extending through said elongated opening, and roller means secured to said lever and engaging said inclined plane characterized in that said roller means comprises a roller mounted to rotate on said lever in response to an input force applied to said lever which causes said roller means to roll on said inclined plane and impart translation movement of said push rod within said cylinder which is axially communicated said piston, said rolling means engaging said inclined plane at a single point while said joint formed by said ball communicates the input force as modified by the vertical inclined plane into said push rod such that substantially only axial translation force is applied to said push rod.

2. The device according to claim 1, characterized in that the push rod is urged toward the lever by at least one Belleville washer (7).

3. The device according to claim 1 wherein said inclined plane form a cam for engagement with said roller means to proportionally modify the input force applied to said lever and correspondingly the translation of the axial movement of said push rod.

4. The device according to claim 1, characterized in that said ball joint consists of a ball retained between said one end of said push rod and said one end of said lever.

* * * * *